March 2, 1971     H. O. BORCK     3,566,634
STEERING COLUMN LOCK--FREE WHEELING

Filed Nov. 7, 1968     2 Sheets-Sheet 2

INVENTOR
HOWARD O. BORCK

BY John W Butcher
ATTORNEY

United States Patent Office 3,566,634
Patented Mar. 2, 1971

3,566,634
STEERING COLUMN LOCK—FREE WHEELING
Howard O. Borck, Detroit, Mich., assignor to Borg-Warner Corporation, Chicago, Ill.
Filed Nov. 7, 1968, Ser. No. 774,157
Int. Cl. B60r 25/02, 25/06; E05b 65/12
U.S. Cl. 70—252       17 Claims

ABSTRACT OF THE DISCLOSURE

An anti-theft device for motor vehicles associated with the steering column and the ignition switch such that by placing the ignition switch in a predetermined inoperative position, subsequent rotation of the steering wheel and the steering shaft associated with it will cause a cessation of driving engagement between an upper steering shaft and a lower steering shaft allowing the upper shaft and the steering wheel connected to it to freewheel with respect to the lower shaft and the steering linkage connected thereto.

SUMMARY OF THE INVENTION

Safeguard mechanisms operating generally as anti-theft devices have long been incorporated in motor vehicles in addition to the standard ignition lock. One such device is a steering column lock which when activated generally operates to dissociate the steering wheel from the steering linkage.

The present invention is directed to such a device and is operative such that when the steering lock is activated and the steering wheel is turned, the wheel and an upper steering shaft will freewheel with respect to a lower steering shaft and the steering linkage.

One weakness which has become apparent in presently existing steering column locks is the susceptability to lock breakage or steering component damage when a vehicle thief attempts to overcome a steering wheel lock by the use of excessive force such as by application of a pipe wrench to the steering wheel. Thus there is a need for a lock mechanism which cannot be broken by use of excessive force.

Most locks which are not susceptible to easy destruction when excessive force is applied result in damaged steering components upon application of such excessive force which can only be repaired or replaced at relatively large cost to the vehicle owner. The present invention provides a steering column lock which prevents damage to the steering components by precluding the possibility that excessive force will be applied to overcome the restraints imposed by the lock.

DETAILED DESCRIPTION

Figure 1:
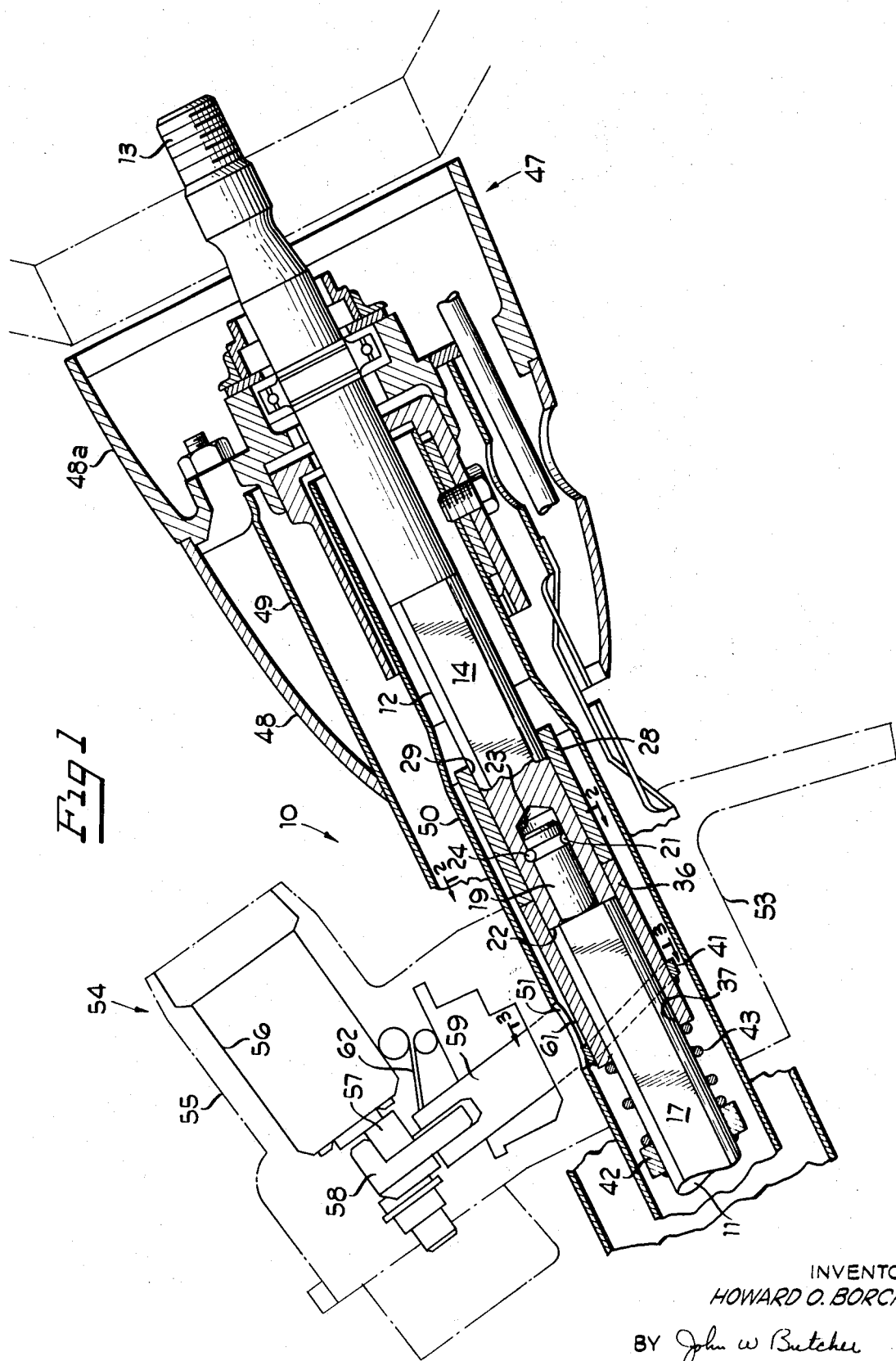
FIG. 1 is a section view of the steering column assembly.
Figure 2:
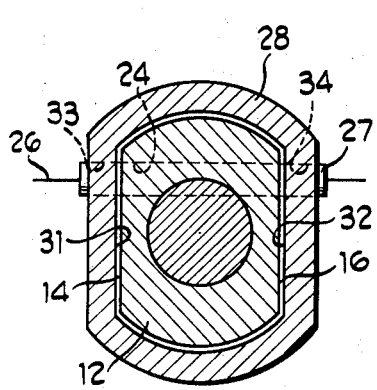
FIG. 2 is a section view taken along the lines 2—2 of FIG. 1.
Figure 3:
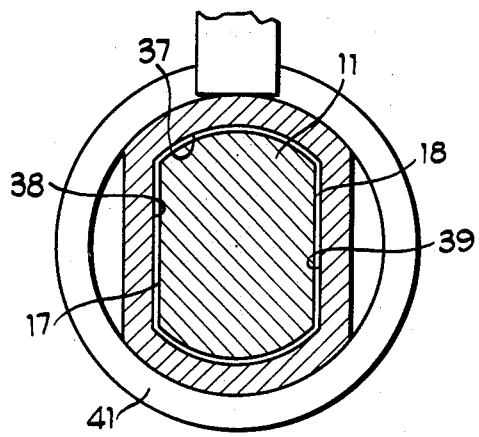
FIG. 3 is a section view taken along the lines 3—3 of FIG. 1.

Referring now to FIG. 1, the steering mechanism 10 comprises a lower shaft 11 adapted at its lower end to be connected to a steering linkage (not shown) and an upper shaft 12 adapted at one end 13 to be connected to a steering wheel. Upper shaft 12 includes a pair of generally parallel flat surfaces 14 and 16 as shown in FIG. 2. Lower shaft 11 includes a pair of generally parallel flat surfaces 17 and 18 as shown in FIG. 3. The lower shaft 11 is shown as being solid and includes a cylindrical projection 19 extending axially from the upper end of the lower shaft 11. Projection 19 defines an annular groove 21 around the periphery of the projection 19.

The upper shaft 12 is substantially solid but a lower end 22 defines a bore 23, concentric with the shaft 12. The shaft 12 also defines a second bore 24 extending through the shaft 12, such bore having a central axis 26 normal to the central axis of the shaft 12. A pin 27 is provided to be inserted through the second bore 24 for a purpose which will soon become apparent.

An upper coupling member 28 is shown positioned over the upper shaft 12 and defines a bore 29 therethrough including a pair of generally parallel flat interior surfaces 31 and 32 corresponding to the flat surfaces 14 and 16 on the shaft 12. As is apparent from FIG. 2, the shaft 12 and upper coupling member 28 are non-rotatable with respect to each other. The upper coupling member 28 further defines a bore 33 and a bore 34 coaxial with each other and lying in a direction normal to the central axis of the upper coupling member 28. The bores 33 and 34 are adapted to receive the pin 27. Thus as shown in FIG. 2, the pin 27 is inserted through bore 33 in upper coupling member 28, bore 24 in upper shaft 12, groove 21 in projection 19 and bore 34 in upper coupling member 28 thereby preventing axial movement between upper coupling member 28, shaft 12 and shaft 11.

Such an arrangement provides for connecting upper coupling member 28 and upper shaft 12 in a non-rotatable, axial immobile relationship while further providing a bearing surface between projection 19 of shaft 11 and shaft 12. The annular groove 21 allows relatively free uninterrupted rotation between projection 19 and upper shaft 12 while preventing any relative axial movement between them.

As shown in FIG. 1, a lower coupling member 36 is positioned over the lower shaft 11. The lower coupling member 36 defines a bore 37 therethrough including a pair of generally parallel flat interior surfaces 38 and 39 which correspond to the flat surfaces 17 and 18 on the lower shaft 11. The lower coupling member 36 is adapted to be positioned over and surround the lower shaft 11. As is best shown in FIG. 3, the lower shaft 11 and the lower coupling member 36 are non-rotatable with respect to each other. The lower coupling member 36 is adapted to slide axially along the shaft 11.

Affixed to the lower coupling member 36 is an inclined annular ring 41 disposed within a plane lying at an acute angle with the central axis of the shaft 11. The ring 41 is affixed to the lower coupling member 36 by some suitable method such as welding so that the ring 41 is non-rotatable and axially immobile with respect to the lower coupling member. The inclined ring 41 is adapted to function as a cam member as will be later described.

An annular ring 42 is positioned on and affixed to the lower shaft 11 by some suitable method such as welding which renders the ring 42 non-rotatable and axially immobile with respect to the shaft 11. A resilient member 43, shown as a coil spring, is positioned over the lower shaft 11 and acts against an end face of the annular ring 42 and an end face of the lower coupling member 36 to urge the lower coupling member 36 into driving engagement with the upper coupling member 28.

Figure 4:
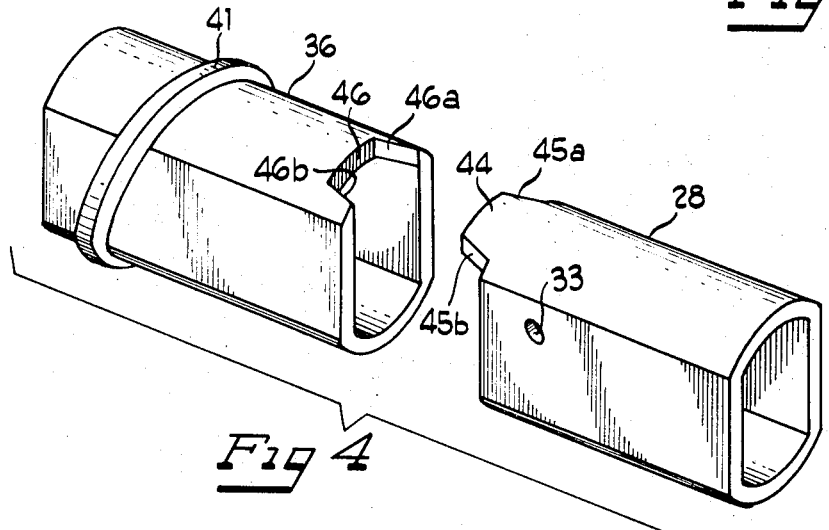
FIG. 4 is a detail exploded view of the upper and lower collars.

As best shown in FIG. 4, the upper coupling member 28 includes an axially extending projection 44 extending outwardly from the lower end of the upper coupling member. The projection includes a pair of inclined side walls 45a and 45b inclined toward each other at the outermost end. The lower coupling member 36 defines an axially oriented indentation 46 including a pair of inclined side walls 46a and 46b inclined toward each other at the innermost end. The lower coupling member is adapted to receive the projection of upper coupling member 28 and to thereby form a driving coupling engagement. It can easily be seen that such a coupling could be formed utilizing a plurality of projections and indentations but in the interest of simplicity only one such projection and indentation is shown.

Support means 47 is provided to support the shafts 11 and 12 and particularly comprises an outer housing 48, an upper shell member 48A, a jacket 49 and a shift tube 50 of which housing 48 is an integral part and which may be associated with a transmission (not shown). The shift tube 50 defines an opening 51 in its periphery, the purpose for which will become apparent. The jacket member 49 is fixedly carried by means of a clamp 53 surrounding the outer surfaces thereof and which may be secured to a rigid portion of the vehicle, normally the dashboard.

Also incorporated in the dashboard is an ignition switch 54 including a housing 55 and an ignition lock barrel 56. Attached to the shaft of lock barrel 56 is a cam member 57 which is associated with a follower 58. The follower 58 is pivotally attached to a pawl member 59 including an end 61. The pawl member 59 is associated with a resilient member 62 which urges the pawl member in a direction generally toward the lower coupling member 36 as illustrated in FIG. 1.

The operation of the present invention is as follows: when the vehicle is being operated, with the ignition switch in the "ON" position, the lock barrel 56 will be positioned to maintain the pawl member 59 withdrawn from engagement with the shift tube 50 and the inclined ring 41. When turning movement of the vehicle wheels is desired, the steering wheel is rotated thereby causing rotation of the upper shaft 12 and the upper coupling member 28 affixed thereto. As previously described, resilient member 43 acts against annular ring 42 attached to the lower shaft 11 to urge the lower coupling member 36 into driving engagement with the upper coupling member 28. Therefore, any rotation of the upper shaft 12 and upper coupling member 28 acts to rotate the lower coupling member 36 by virtue of its driving engagement with the upper coupling member 28. Correspondingly, rotation of the lower shaft 11 occurs by virtue of its non-rotatable relationship with lower coupling member 36.

Figure 5:
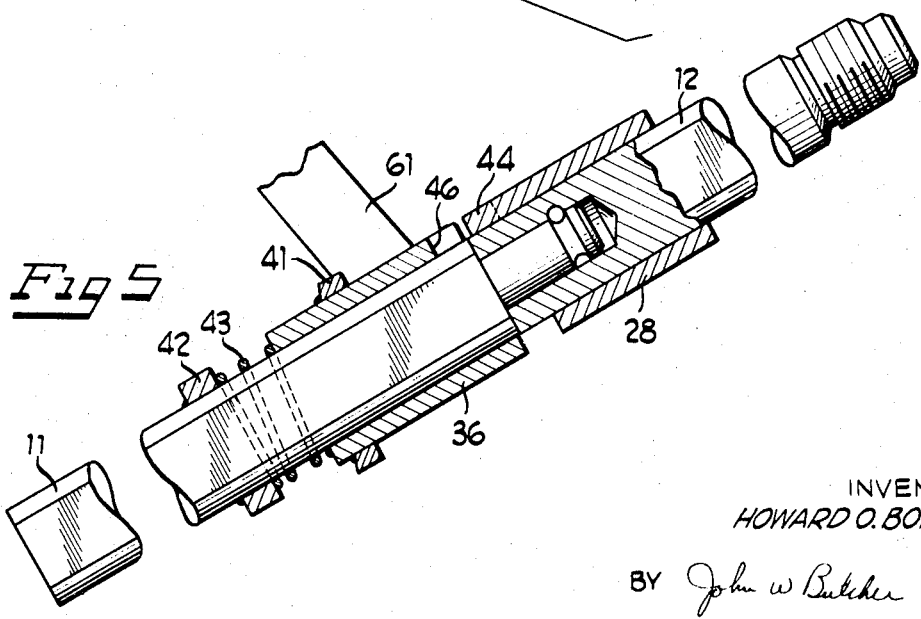
FIG. 5 is a section view of the steering column lock showing the collars disengaged.

When the vehicle has been brought to a stop and it is desired to lock the vehicle, the shift lever will be positioned in either the "PARK" position for automatic transmissions or the "REVERSE" position for manual transmissions. The ignition switch 53 will be rotated counterclockwise and positioned in the "LOCK" position causing a rotation of the cam member 57 with the ignition lock barrel 56 thereby releasing the follower 58 and pawl member 59 connected thereto. Resilient member 62 will urge pawl member 59 through opening 51 in shift tube 50 and into engagement with the inclined ring 41 as shown in FIG. 5. If the inclined ring 41 is positioned such that the pawl member 59 rides on top of it, as opposed to engaging it in a camming relationship, slight rotation of the steering wheel will rotate the inclined ring to a position allowing the pawl member to engage it in the desired camming relationship.

The opening 51 in shift tube 50 is formed such that it will allow the pawl member 59 to pass through tube 50 only when the shift lever is in the "PARK" position for automatic transmissions or the "REVERSE" position for manual transmissions.

The incorporation of this transmission locking device in no way weakens or impairs the usual steering mechanism and provides a further hindrance to theft of the vehicle. Since pawl member 59 is inserted through opening 51 in shift tube 50, the shift tube and transmission are locked in an inoperative forward drive condition.

Any subsequent rotation of the upper shaft 12 will cause a corresponding rotation of the upper coupling member 28, lower coupling member 36 and inclined ring 41. Rotation of the ring 41 due to its inclination and its contact with the pawl member will cause the lower coupling member 36 to move axially downwardly along the lower shaft 11 against the force of the resilient member 43 and out of driving engagement with the upper coupling member 28.

When this point is reached, as illustrated in FIG. 5, and the upper and lower coupling members are no longer in driving engagement, rotation of the upper shaft 12 will cause rotation of the upper coupling member 28 with respect to lower shaft 11 and lower coupling member 36. The result is a freewheeling of the steering wheel with respect to the steering gear box and the steered wheels. Such a relationship eliminates the possibility of a would-be thief breaking the steering column lock or damaging the steering components by application of an excessive amount of force to the steering wheel.

When it is subsequently desired to restore the steering components to an engaged position, ignition switch 54 will be rotated clockwise to the "ON" position thereby withdrawing the pawl member 59 from its contact with the inclined ring 41. This will allow the force of the resilient member 43 to urge the lower coupling member 36 to move axially upwardly along the lower shaft 11 and to resume driving engagement with the upper coupling member 28. Transmission shift tube 50 is also freed for rotation. Any subsequent rotation of the upper shaft 12 will result in a corresponding rotation of the lower shaft 11 as previously described.

Thus, it has been shown that an anti-theft device has been provided effective to disengage the steering wheel from the steering linkage in the event of an attempted theft.

It has also been shown that because of the unique features of this anti-theft device, it is virtually impossible to either break the lock or damage the steering mechanism due to an excessive torque being exerted.

It has further been shown that an anti-theft device has been provided which, when activated, locks the shift tube against rotation in an inoperative forward drive condition.

While a preferred embodiment of the invention has been specifically disclosed, it is to be understood that the principles of the invention could be applied to other devices as is apparent to those skilled in the art. Therefore, the invention is to be given its broadest interpretation within the scope of the following claims.

What is claimed is:

1. A steering column lock for a motor vehicle including a steering linkage; a pair of coaxial shafts comprising a first shaft and a second shaft connectable one to another, one of said shafts connected to said steering linkage, said shafts being rotatable with respect to each other; coupling means operatively connecting said first shaft to said second shaft, said coupling means being capable of providing an engaged condition or a disengaged condition between said first shaft and said second shaft; biasing means associated with said coupling means adapted to urge said coupling means into said engaged condition; means defining a cam member fixed to said coupling means, said cam member engageable by a locking pawl and operative upon rotation of one of said shafts with respect to said pawl to urge said coupling means into said disengaged position.

2. A steering column lock as claimed in claim 1 in which said coupling means includes a first coupling member connected to one of said shafts for rotation therewith and fixed against axial movement along said shaft, a second coupling member attached to the other of said shafts connected for rotation with and axially slidable along said shaft, said cam member associated with said second coupling member.

3. A steering column lock for a vehicle as claimed in claim 2 in which one of said coupling members includes a driving end defining at least one axially extending projection and the other of said coupling members including a driven end defining at least one axially inwardly extending opening adapted to matingly receive said axial projection.

4. A steering column lock for a vehicle as claimed in claim 3 in which said driving end includes a plurality of axially extending projections and said driven end includes a plurality of axially inwardly extending openings.

5. A steering column lock for a vehicle as claimed in claim 3 in which said axially extending projection defines a pair of inclined side walls, each of said side walls being inclined at an angle toward the other of said side walls.

6. A steering column lock for a vehicle as claimed in claim 3 in which said inwardly extending opening defines a pair of said walls, each of said side walls inclined at an angle away from the other of said side walls.

7. A steering column lock for a vehicle as claimed in claim 1 in which said means defining a cam member consists of an inclined annular ring connected to said coupling means, said ring having a central axis disposed at an angle to the central axis of said coupling means.

8. A steering column lock for a vehicle comprising: a steering linkage adapted to be connected to at least one steerable wheel; a steering wheel; a first shaft connected to said steering linkage at one end; a second shaft connected to said steering wheel at one end, and to said first shaft at its other end, said second shaft and said first shaft being rotatable with respect to each other; a tubular member surrounding said shafts; a first coupling member connected to said first shaft non-rotatable and axially slidable with respect to said shaft; a second coupling member associated with said second shaft non-rotatable and axially immobile with respect thereto, adapted to be coupled in driving engagement with said first coupling member; biasing means urging said first and second coupling members into driving engagement; means defining a cam member fixed to said first coupling member; locking means associated with said vehicle protrudable through said tubular member and engageable with said cam member whereby upon rotation of said first shaft, said first coupling will be urged axially along said first shaft out of driving engagement with said second coupling member thereby allowing said second shaft and said steering wheel to freewheel with respect to said first shaft and said steering linkage.

9. A steering column lock for a vehicle as claimed in claim 8 including means defining an ignition switch associated with said locking means, capable of being selectively placed in a plurality of operative positions, said switch adapted, when placed in at least one of said positions to urge said locking means into contact with said means defining a cam member.

10. A steering column lock for a vehicle as claimed in claim 8 in which one of said clutch members includes a driving end defining at least one axial projection and the other of said clutch members includes a driven end defining at least one axially inwardly extended opening adapted to matingly receive said axial projection.

11. A steering column lock for a vehicle as claimed in claim 8 in which said means defining a cam member consists of an inclined annular ring connected to said first coupling member, said ring having a central axis disposed at an acute angle to the central axis of said first coupling member.

12. A steering column lock and transmission shift lock including: a pair of coaxial shafts connected one to another, said shafts being rotatable with respect to each other; a transmission shift tube defining at least one aperture in the side thereof; a transmission shift lever associated with said transmission shift tube; means to support said pair of shafts and said shift tube in a concentric arrangement; releasable coupling means on said shafts including a first coupling member non-rotatably mounted on a first shaft, axially slidable thereon, and a second coupling member non-rotatably mounted on a second shaft axially immobile thereon; biasing means urging said first and second coupling members into engagement; means defining a cam member associated with said first coupling member; a locking pawl member effective to engage said cam member; an ignition switch associated with said locking pawl member such that when said ignition switch is in at least one of several selective positions and said transmission shift lever is in at least one of several positions, said locking pawl member is urged through said aperture in said shift tube locking the transmission in an inoperative forward drive condition and is further urged to engage said cam member whereby upon rotation of said first shaft, said first coupling member will be urged axially along said first shaft out of driving engagement with said second coupling member.

13. A steering column lock and transmission shift lock as claimed in claim 12 including biasing means associated with said pawl member whereby said biasing means is adapted to urge said pawl member into engagement with said shift tube and said cam member when said ignition switch and said transmission shift lever are in nonoperative forward drive positions.

14. A steering column lock and transmission shift lock as claimed in claim 12 in which said means defining a cam member consists of an inclined annular ring connected to said first coupling member, said ring having a central axis disposed at an acute angle to the central axis of said first coupling member.

15. A steering column lock for a vehicle comprising: a pair of shafts connectable one to another, said shafts rotatable with respect to each other; a tubular member surrounding said shafts; driving means connected to one of said shafts and driven thereby; driven means associated with the other of said shafts and non-rotatable with respect thereto adapted to be drivingly engaged by said driving means; biasing means urging said driving and driven means into driving engagement; means defining a cam member fixed to said driven means; a locking pawl normally disposed exterior to said tubular member and fixed against rotation with respect thereto protrudable through said tubular member and selectively engageable with said cam means whereby upon rotation of said drive means, said locking pawl and said cam means will coact to disengage said driven means and said driving means allowing said driving means and said shaft connected thereto to rotate with respect to said housing without corresponding rotation of said driven means and said shaft associated therewith.

16. A steering column lock for a vehicle as claimed in claim 15 whereby said means defining a cam member consists of an inclined annular ring connected to said driven member said inclined annular ring having a central axis disposed at an angle to the central axis of said driven member.

17. A steering column lock for a vehicle as claimed in claim 15 including an ignition switch for said vehicle associated with said pawl capable of being selectively placed in a plurality of operative positions said switch when placed in at least one of said positions operative to urge said pawl into contact with said cam means.

References Cited
UNITED STATES PATENTS

| | | | |
|---|---|---|---|
| 605,981 | 6/1898 | Trautner | 70—189 |
| 1,005,496 | 10/1911 | Armbruster | 70—223 |
| 1,487,863 | 3/1924 | Lavigne | 70—183 |
| 1,518,496 | 12/1924 | Essert | 70—188 |
| 1,918,411 | 7/1933 | Lowe | 70—223 |

MARVIN A. CHAMPION, Primary Examiner

R. L. WOLFE, Assistant Examiner

U.S. Cl. X.R.

70—248, 422